Oct. 4, 1966          E. F. ANTAL ET AL          3,276,969
DEVICE FOR MONITORING SHUT-DOWN NUCLEAR REACTORS
Filed Sept. 17, 1965                              2 Sheets-Sheet 1

INVENTORS
EMIL F. ANTAL
CHARLES D. BRONS
FRANK B. QUINLAN

BY Roland G. Anderson
ATTORNEY

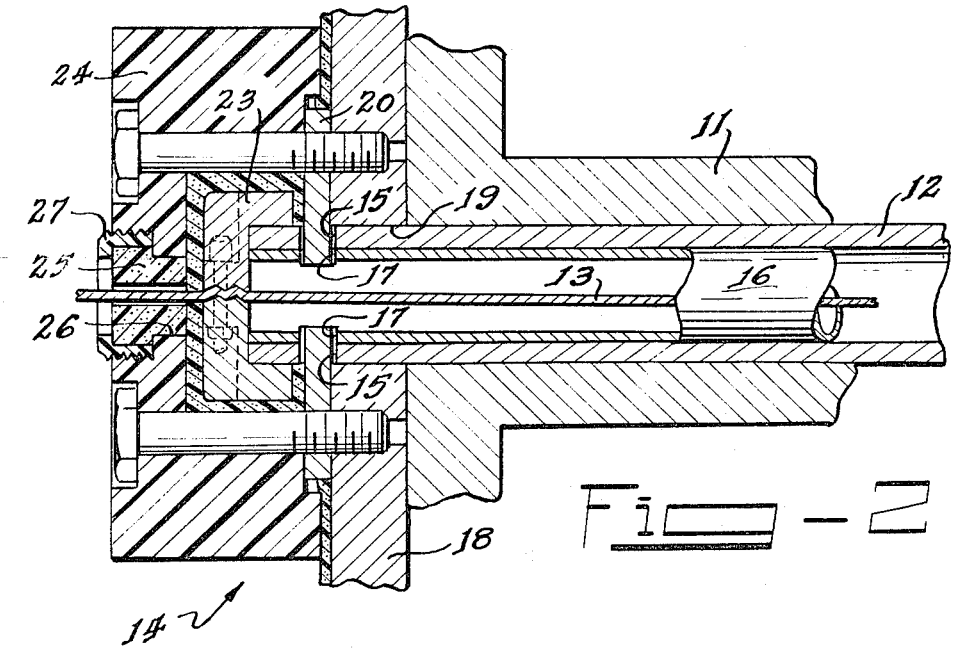
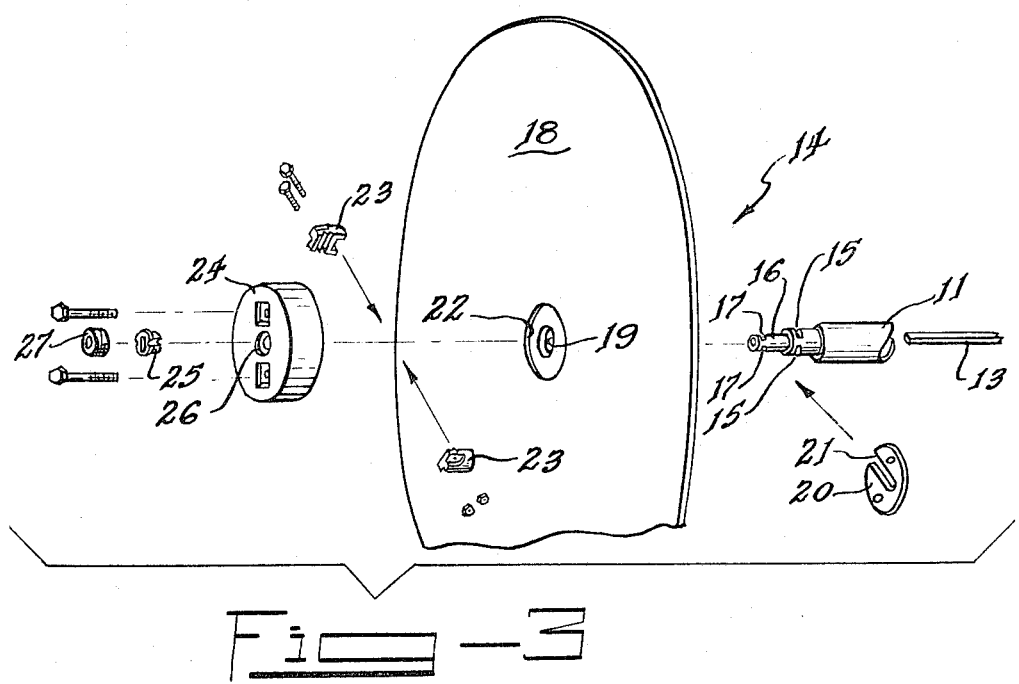

United States Patent Office 3,276,969
Patented Oct. 4, 1966

3,276,969
DEVICE FOR MONITORING SHUT-DOWN NUCLEAR REACTORS
Emil F. Antal, Kennewick, Charles D. Brons and Frank B. Quinlan, Richland, and Stanley J. Ostrom, Kennewick, Wash., assignors to the United States of America as represented by the United States Atomic Energy Commission
Filed Sept. 17, 1965, Ser. No. 488,292
5 Claims. (Cl. 176—87)

The invention described herein was made in the course of, or under, a contract with the United States Atomic Energy Commission.

This invention relates to a device for monitoring shut down nuclear reactors to detect use thereof. In still more detail, the invention relates to a device for verifying the dormancy of a shut down production reactor.

It is hoped that the major powers of the world can agree to close down some of their plutonium production reactors in the interests of reducing or limiting the build-up of their stock piles of nuclear weapons. Any such agreement must, of course, be accompanied by safeguards which will insure that all participating countries are complying with their agreement. In keeping with this philosophy, the United States has announced that it is prepared to permit international inspection of a shut-down production reactor. If other countries will agree to corresponding verified reactor shut-downs, the United States' offer to accept international inspection would be extended as other reactors are shut down.

If an international agreement is to be workable, it must, of course, be accompanied by assurance that the agreement is kept by all countries concerned. This necessarily entails international inspection. While it would be perfectly possible to maintain a team of inspectors at the site of the reactor at all times to assure that the reactor is not operated, this would be quite expensive, besides being unduly obtrusive to national sovereignty. Thus periodic inspections are preferred.

Periodic inspections must rely on some system or device which will disclose with a high degree of confidence no more and no less than that the reactor being inspected is not presently being operated and has not been operated since the last inspection. The system should be simple in concept but should also be effective enough so as not to tempt cheating. On the other hand, the system should be as unobtrusive as possible on a country's national sovereignty and desires to protect classified information and techniques, while still carrying out the requirements of inspection. Thus the frequency of inspections should be minimized, the degree of access to the reactor should be minimized, and the amount of time spent by inspectors at the reactor should be minimized. Also the reactors should not be incapacitated or harmed by or because of inspection. Thus positive disabling of the reactor, destructive testing, or permanent attachments are not permissible.

It is accordingly an object of the present invention to develop a device for verifying the dormancy of a nuclear reactor.

It is another object of the present invention to develop a tamperproof safing device designed for installation in a nuclear reactor to detect operation thereof.

It is also an object of the present invention to develop such a safing device which will minimize frequency of inspections, degree of access and the amount of time spent by inspectors at the reactor.

These and other objects of the present invention are attained with a shutdown device incorporating (1) target material placed in the reactor core which will become radioactive in the event of a neutron chain reaction, (2) a wire or tape which fixes the position of the target atoms in the reactor and clearly shows any tampering therewith, and (3) an exterior seal at each end of the channel to assure that the wire or tape has not been removed completely from the reactor. The wire or tape consists of a long thin flexible member comprising a metal matrix containing a target material which will become radioactive in the event of a neutron chain reaction and integral therewith a random array of metal particles or strands of wire which form a nonduplicatable pattern. The X-ray pattern formed by these particles or wire strands serves to "fingerprint" the safing device.

The invention will next be described in connection with the accompanying drawing wherein:

FIG. 2 is a vertical cross section taken through the end of one process tube incorporating a safing device according to the present invention.

FIG. 3 is an exploded view of a seal at the end of the safing device.

Figure 1:
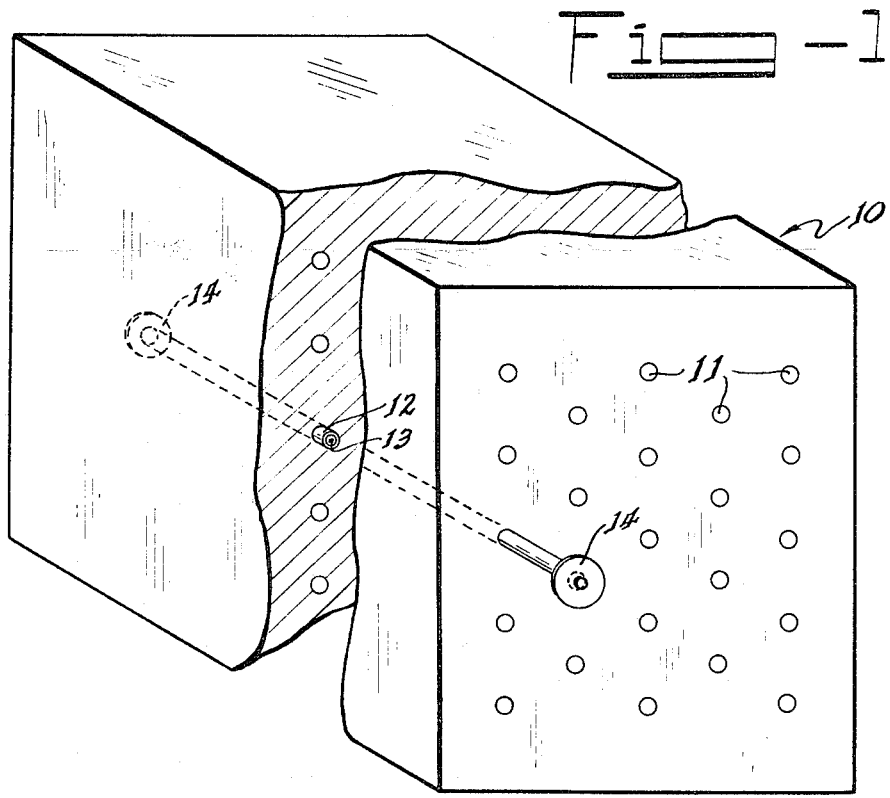
FIG. 1 is a schematic perspective view of a nuclear reactor incorporating a safing device according to the present invention.

Referring now to FIG. 1 of the drawing, a nuclear reactor 10, which has been shut down, includes a plurality of channels 11 extending therethrough, each of which contains a metal liner tube 12. Safing member 13 runs through tube 12 from a safing seal 14 at one side of the reactor to a similar seal at the other side of the reactor. Safing member 13 may take several alternate forms which will be described hereinafter. Any desired number of safing members, either of the same or different types, may be employed in different process channels.

Referring next to FIGS. 2 and 3, liner tube 12 has two opposed slots 15 at the sides thereof near the end of the tube. A relatively short aluminum protective sleeve 16 which is inserted in the end of liner tube 12 also has two opposed slots 17 at the sides thereof near the end of the sleeve. A large aluminum safing plate 18 is disposed on liner tube 12 with safing member 13, protective sleeve 16, and liner tube 12 projecting through a center hole 19 therein. A locking plate 20 having a radial slot 21 therein is inserted into aligned slots 16 and 17. In its assembled position locking plate 20 is seated in countersink 22 in plate 18.

The end of safing member 13 is held by a steel collet 23 which is seated on the end of liner tube 12. Locking plate 20 is covered by a Lucite safing cap 24 which is bolted to safing plate 18. A Lucite cap insert 25 is disposed in a receptacle 26 formed in safing cap 24 and held in place by a screw-type retainer 27.

Installation of the safing system will next be described. Liner tube 12 has previously been inserted in a channel 11 of the reactor to be monitored. Safing member 13 is first inserted through liner tube 12, protective sleeve 16 is then slipped over safing member 13 and inserted into liner tube 12, and safing plate 18 is placed against the side of the reactor with the safing member 13, protective sleeve 16 and liner tube 12 projecting through hole 19 therein. Protective sleeve 16 is now adjusted so that slots 17 and slots 15 are in alignment, locking plate 20 is inserted through these slots, and the safing plate is pulled forward to seat locking plate 20 in countersink 22. If desired, a small amount of an epoxy resin containing mica flakes, tungsten or tantalum particles may be applied to the locking plate slot.

Collet 23 is then assembled and inserted over the end of safing member 13 and seated on the end of liner tube 12. The safing member is then adjusted in the collet so that it is slack in the liner tube. Collet 23 is then tightened securely on the safing member.

Lucite safing cap 24 is now bolted in place in countersink 22 and cap insert 25 is held in receptacle 26 by retainer 27. Additional safing members (not shown) may be drawn across the face of the reactor between safing seals 14 on different safing devices and secured by inserting the members through the cap insert 25. Epoxy sealant is then applied to the entire assembly.

Various other precautions against tampering may, of course, be taken in association with or in addition to the described safing devices if such is deemed necessary or desirable.

Each of the epoxy seals as well as the Lucite safing caps 24 contain a random array of metal or mica particles. Likewise, safing plate 18 is formed of aluminum and contains tungsten, tantalum or copper wire in a random arrangement. Each of the seals is photographed and X-rayed in place immediately after installation and again after each inspection. Comparison of the photographs and X-rays clearly indicates whether the seals at the end of each safing band have been tampered with.

Figure 4:
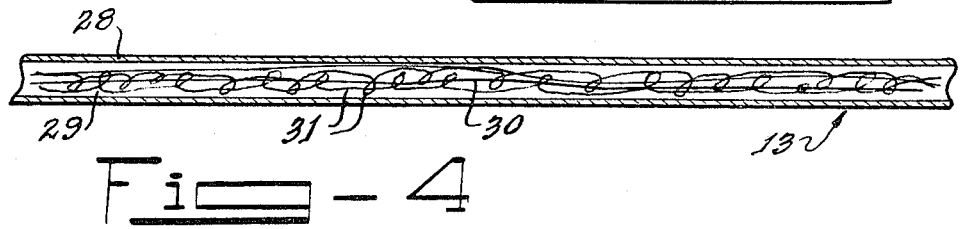
FIG. 4 is a cross section before swaging of one form of safing member.

To avoid any possibility that safing member 13 might be cut while leaving the seals intact, the safing members 13 are also fingerprinted as will now be described. As shown in FIG. 4, one embodiment of safing member 13 comprises a bimetallic wire consisting of a jacket 28 surrounding a lower melting core 29. Core 29 contains fine cobalt wires 30 for sensitivity to neutrons and fine tungsten wires 31 for opaqueness to X-rays. The wire is prepared by coextrusion of the jacket metal over the lower melting core. The lower melting point core material is first introduced in wire form together with smaller quantities of the other metals in the form of finer wires into a tube of the jacket material and the combination is coextruded. The coextruded wire may be flattened by rolling if desired. An X-ray pattern of the random orientation of the fine twisted tungsten strands within the wire provides its "fingerprint." The differences in melting temperature between the core and the jacket of the bimetallic wire will cause flaws to be formed if repair of cuts is attempted by welding or brazing. Attempts at rebonding by other than metallic means are disclosed by eddy current monitoring.

Construction of a coextruded safing wire 13 in accordance with the present invention will next be described in detail. Two long strands of tungsten wire about 0.010 cm. in diameter, which have been wound around a small nonuniform object to induce random looping, one long strand of cobalt wire about 0.020 cm. in diameter, and one long strand of aluminum wire about 0.16 cm. in diameter are pulled through a stainless steel tube which is about 0.475 cm. in outside diameter and has a wall thickness of 0.051 cm. Copper may also be used. The tungsten strands should be extended only as necessary to allow them to feed into the tube; they should otherwise be allowed to kink within the tube. Additional aluminum powder may also be introduced if desired with use of a pneumatic vibrator. The filled tube is then rotary swaged to compact the assembly and bring it to 0.25 cm. in diameter. The round wire may then be used as such or it may be rolled to a rectangular shape having a width at least twice its thickness.

Figure 5:
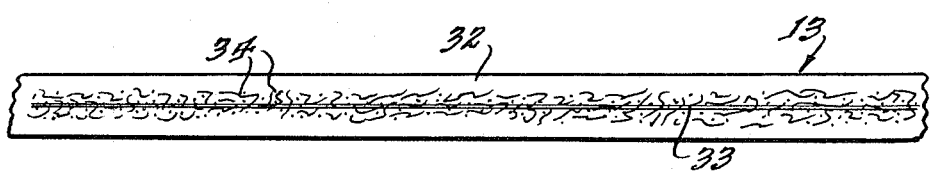
FIG. 5 is a plan view of another form of safing member.

A second type of safing member which may be used as such or in combination with the safing wire previously described will next be described in connection with FIG. 5 of the drawing. The safing member 13 consists of a stainless steel tape 32, approximately one centimeter in width, containing cobalt wires 33 to one side of which is affixed a random pattern of tungsten particles 34 by a continuous weld. This tape is prepared by incorporating a cobalt wire less than or equal to 0.020 cm. in diameter in a stainless steel tube about 0.7 cm. outside diameter and about 0.08 cm. in wall thickness and rolling the tubing in a flat band with the cobalt wire solidly enclosed. Tungsten particles are then poured along a section of the strip of metal and a continuous welding bead is run along the particles.

X-ray is again the fingerprinting method. The tape has sufficient resistance by virtue of its composition, size and strength that it is highly unlikely that a break and repair could be made that would not destroy a detectable portion of the fingerprinting pattern on the band.

An international inspection team will initiate the above-described system at one visit to the reactor; at their next visit they will verify that the seals have not been subjected to tampering, will break the seals and remove the safing members from two or more of the flux monitoring channels selected at random, will verify that the safing members have not been tampered with and will read the radioactivity level of the detector material.

It will be understood that the invention is not to be limited to the details given herein but that it may be modified within the scope of the appended claims.

The embodiments of the invention in which an exclusive property or privilege is claimed are defined as follows:

1. A long thin flexible member for installation in a nuclear reactor to detect operation of the reactor, comprising a metal matrix containing a target material which will become radioactive in the event of a neutron chain reaction and integral therewith a random array of bodies of a different metal forming a pattern not subject to reproduction to identify the flexible member.

2. A flexible member according to claim 1 wherein said metal matrix consists of a jacket formed of a high melting metal surrounding a lower melting core, said core containing at least one cobalt wire extending the length thereof and fine tungsten wires disposed therein in random array.

3. A flexible member according to claim 2 wherein said jacket is stainless steel or copper and said lower melting core is aluminum.

4. A flexible member according to claim 1 wherein said metal matrix is a stainless steel tape containing at least one cobalt wire extending the length thereof and a random pattern of tungsten particles attached thereto by a continuous weld.

5. A tamperproof safing device including a flexible member according to claim 1 and exterior seals at each end thereof, said seals consisting of a plastic body containing a random array of metallic particles in a three-dimensional form not subject to reproduction.

References Cited by the Applicant

I: Disarmament and Arms Control 15 (1964), p. 14–15.

REUBEN EPSTEIN, *Primary Examiner.*